(12) United States Patent
Meyer et al.

(10) Patent No.: US 10,689,296 B2
(45) Date of Patent: Jun. 23, 2020

(54) PROCESS FOR MANUFACTURING A GYPSUM SLURRY OR A GYPSUM PRODUCT WITH THE USE OF A WAX POWDER, PRODUCTS OBTAINED BY THE PROCESS AND USE OF THE WAX POWDER FOR OBTAINING A MOISTURE-RESISTANT GYPSUM PRODUCT

(71) Applicant: Sasol Wax GmbH, Hamburg (DE)

(72) Inventors: Gernot Meyer, Rosengarten (DE); Thorsten Frick, Hamburg (DE); Thomas Haas, Winsen/Luhe (DE)

(73) Assignee: Sasol Wax GmbH, Hamburg (DE)

( * ) Notice: Subject to any disclaimer, the term of this patent is extended or adjusted under 35 U.S.C. 154(b) by 388 days.

(21) Appl. No.: 15/534,374

(22) PCT Filed: Dec. 17, 2015

(86) PCT No.: PCT/EP2015/002545
§ 371 (c)(1),
(2) Date: Jun. 8, 2017

(87) PCT Pub. No.: WO2016/096136
PCT Pub. Date: Jun. 23, 2016

(65) Prior Publication Data
US 2017/0362125 A1 Dec. 21, 2017

(30) Foreign Application Priority Data
Dec. 17, 2014 (EP) .................... 14198660

(51) Int. Cl.
C04B 28/14 (2006.01)
C04B 40/00 (2006.01)
B28B 19/00 (2006.01)
B32B 9/00 (2006.01)
B32B 29/00 (2006.01)
C04B 111/00 (2006.01)

(52) U.S. Cl.
CPC .......... C04B 28/14 (2013.01); B28B 19/0092 (2013.01); B32B 9/005 (2013.01); B32B 29/002 (2013.01); C04B 40/0042 (2013.01); B32B 2305/30 (2013.01); B32B 2391/00 (2013.01); B32B 2607/00 (2013.01); C04B 2111/0062 (2013.01)

(58) Field of Classification Search
CPC ............... C04B 40/0042; C04B 28/14; C04B 2111/0062; B28B 19/0092; B32B 2607/00; B32B 29/002; B32B 9/005; B32B 2391/00; B32B 2305/30
See application file for complete search history.

(56) References Cited

U.S. PATENT DOCUMENTS

| | | | | |
|---|---|---|---|---|
| 2,699,414 A * | 1/1955 | Selbe | ...... | C04B 24/16 428/330 |
| 5,437,722 A * | 8/1995 | Borenstein | ...... | C04B 28/14 106/270 |
| 2009/0194004 A1* | 8/2009 | Meyer | ...... | C04B 28/14 106/660 |
| 2013/0042792 A1* | 2/2013 | Stuart | ...... | C04B 28/14 106/640 |
| 2013/0323508 A1* | 12/2013 | Schneider | ...... | C10G 73/40 428/402 |

FOREIGN PATENT DOCUMENTS

| | | |
|---|---|---|
| DE | 205423 | 12/1983 |
| DE | 19628749 | 1/1998 |
| EP | 1556313 | 7/2005 |
| GB | 2081242 | 2/1982 |
| GB | 2081242 A * | 2/1982 ............. C04B 28/14 |

* cited by examiner

*Primary Examiner* — Philip C Tucker
*Assistant Examiner* — Jimmy R Smith, Jr.
(74) *Attorney, Agent, or Firm* — Bushman Werner, P.C.

(57) ABSTRACT

The invention relates to a process for manufacturing a gypsum slurry by bringing together and mixing gypsum, water, wax powder and optionally other components, applying the gypsum slurry in a process for manufacturing a gypsum product and a gypsum product such as a plasterboard or wallboard obtained by the process and the use of the wax powder for the manufacturing of a moisture resistant gypsum product.

16 Claims, No Drawings

PROCESS FOR MANUFACTURING A GYPSUM SLURRY OR A GYPSUM PRODUCT WITH THE USE OF A WAX POWDER, PRODUCTS OBTAINED BY THE PROCESS AND USE OF THE WAX POWDER FOR OBTAINING A MOISTURE-RESISTANT GYPSUM PRODUCT

This application is a national phase application of PCT/EP2015/002545, filed Dec. 17, 2015, which claims priority to EP 14198660.4, filed Dec. 17, 2014, the disclosures of which are incorporated herein by reference for all purposes.

The invention relates to a process for manufacturing a gypsum slurry by bringing together and mixing gypsum, water, wax powder and optionally other components, applying the gypsum slurry in a process for manufacturing a gypsum product and a gypsum product such as a plasterboard or wallboard obtained by the process and the use of the wax powder for the manufacturing of a moisture resistant gypsum product.

DESCRIPTION

Mechanical plasterboard properties are influenced by the gypsum core and the paperboard liner and their synergistic interaction. This involves the paperboard acting to reinforce the tension area, which in conjunction with the gypsum core gives the gypsum plasterboard the required strength and flexural rigidity (breaking stress, deformation). Various types of gypsum plasterboard are distinguished, e.g. those that include additives to delay water absorption (impregnated gypsum plasterboard and impregnated fire-resistant gypsum plasterboard).

The water absorption and drying-out time of gypsum plaster-board is tested according to DIN EN 520 (2 hours' spent in water at 23° C.).

|  | plasterboard | impregnated plasterboard |
|---|---|---|
| Water absorption in wt.-% | 30-50 | <5-10 |
| Drying-out times in hrs | 70 | 15 |

Gypsum plasterboard is made from gypsum and additives for the gypsum core, as well as high-grade, repeatedly couched paperboard. Plaster of Paris (low-fired gypsum, produced at temperatures of roughly 120° C. to 180° C.) is frequently used.

In addition, there are also gypsum building materials in the form of wallboards made from gypsum, which are referred to as "gypsum wallboards". These are factory-made building panels made from plaster of Paris and water for non-weight-bearing structural components. Gypsum wallboards may contain fibres, fillers and additive substances, as well as other additives, and they may be coloured with pigments to distinguish them visually. They have smooth visible surfaces and are designed with alternating tongue and groove finishes on the abutting and storage surfaces. Here water-repellent boards are known too.

Plaster board production takes place in highly automated production plants. A homogeneous liquid slurry is made from plaster of Paris, water and possibly additives in a continuous dosage and mixing device. This slurry is poured on the paperliner which lays on a conveyor belt. A roll then presses the upper paperliner on the gypsum surface. Once the slurry has set, the boards are cutted and ejected hydraulically to the dryer. This is followed by drying in a heated continuous drier. After drying, the boards are combined into packages or loaded onto pallets. The production of gypsum wallboard is described in DIN EN 12589.

Gypsum fibre boards are furthermore referred to as gypsum-based plasterboards.

Processes for the manufacturing of impregnated gypsum products are subject of numerous patents and publications. Impregnating compounds are described as useful additives added to the mixer during the phase of the preparation of the mixed goods.

Gypsum products, preferably gypsum plasterboard, are provided with additives that delay water absorption, for use in humid areas. The impregnating additives are usually added to the gypsum slurry before the gypsum products are made and worked into the slurry homogeneously. Afterwards the gypsum products are usually dried at a high temperature of e.g. 100 to 150° C. and then cooled.

If gypsum is not subjected to a water-repellent treatment, humidity causes the paperboard to soften, which leads to deformation and release of the paper liner. The use of gypsum plasterboard in bathrooms, laundry rooms, etc. is therefore problematic due to its diminishing rigidity and deformation. This is in particular detrimental when the gypsum plasterboard has ceramic tiles adhered to it, for example.

The dampness causes the paperboard to soften, lose its inner rigidity and split under the weight of the ceramic tiles, causing the layer of paperboard attached to the boards to fall away. The destruction of the remaining gypsum paperboard is then only a matter of time.

In addition to the diminishing rigidity and deformation, corrosion and mildew can accelerate the destruction. Even the adhesive layer applied to the entire surface for the ceramic tiles, which usually has a synthetic base, cannot inhibit the effect of the dampness.

The use of silicon or siloxane emulsions/dispersions for impregnation is known. In addition, dispersions based on paraffin or Montan waxes are known. Further polymers and resins are also used, which do not fall into the wax category. Polyvinyl-alcohols are referred to as polymers.

The wax components are in some cases also added to the gypsum mixture in powder form. Mixtures of asphalt or bitumen dispersions, in some cases used in combination with polyvinyl alcohols, in which a silicon compound or a synthetic resin emulsion has been added to the gypsum, are likewise known from the literature.

However, it is often difficult to achieve an improvement in water repellency or in making the product more hydrophobic, without deteriorating other important properties such as the required foam stability of the slurry in order to produce enough air voids in the final product.

Aqueous dispersions of the additives are often used due to their better processability and recyclability. Additionally aqueous dispersions can be handled at ambient temperatures and show a low viscosity which eases the mixing process. On the other hand the necessity to use an aqueous carrier (continuous phase) is an inherent disadvantage, because the transportation costs of the dispersion increase. Furthermore aqueous dispersions show limited storage stability and temperature resistance. Some dispersions are also classified as dangerous goods or hazardous to water, which increases logistic costs and efforts even more. Finally dispersions have a higher mass and volume due to the additional amount of water and need more space and additional tanks than 100% active additives.

Solid, powdered additives do not show these disadvantages and can be dosed directly to the total composition of the gypsum.

DD 205423 A1 teaches the use of meltable, solid materials in form of wax or wax-like products for the impregnation of calcium sulfate binding material in a stirrer vessel. The addition of e.g. 3% granulated hard wax composition consisting of 50% paraffin wax and 50% Montan wax at a temperature of 80-100° C. and 30 min stirring time leads to a reduction of the water absorption of 40% after 2 hours for a gypsum product manufactured thereof.

DE 19628749 B4 describes a solid-like hydrophobing agent consisting of 40-50% of a Montan wax fraction obtained from solvent extraction, 40-50% paraffin and up to 10% of fatty acid for the hydrophobing of mineral material such as gypsum. In this process the hydrophobing agent is dry-ground together with the mineral material at low grinding speed and is finely distributed on the surface of the mineral particles. The resulting particle size is <0.5 mm. The grinding process has to be conducted in such a way that the grinding temperature is 20° C. below the melting temperature of the Montan wax fraction of the hydrophobing agent. The hydrophobing agent has a congealing point of 50-65° C., a viscosity of 10 to 25 mPas and an acid number of 2-40 mg KOH/g. Problematic is that the process temperature of the hydrophobing agent, which has to be 20° C. below the melting temperature of the Montan wax fraction to prevent jamming or blockage of the milling apparatus. This results in the requirement of a cooling or the use of only small grinding speeds. The patent therefore suggests the pre-grinding of the hydrophobing agent with the mineral material to obtain stable powdered premix-products.

EP 1556313 B1 describes solids consisting of vegetable triglyceride-waxes as powdered additives to improve the water resistance of plasterboards. The waxes mentioned in EP 1556313 B1 are hydrogenated vegetable waxes with a melting point of 49-85° C. (Mettler drop point). The addition of other substances such as paraffin waxes, Fischer-Tropsch waxes, microcrystalline waxes, bitumen and polyvinylalcohol is also mentioned. EP 1556313 B1 points out that the application of waxes in form of powders "for use in the manufacturing moisture resistant gypsum boards is desirable, because most of the components used today in the manufacture of gypsum are handled as dry powders prior to their being mixed at the point of injection onto the paper stock."

Furthermore, the waxes presently used in manufacturing water resistant gypsum have relatively low melting points and are soft. This combination of a low melting temperature and broad molecular weight distribution results in a wax that will melt if ground in a commonly used size reduction device such as a hammer mill. Cooling while grinding, either through mechanical or cryogenic means is possible, but the resulting significant increase in processing costs makes the technique impractical.

An alternative to process a low melting point paraffin to a powder form is to spray atomize the wax through high-pressure nozzles. Paraffins with melting points below about 71.2° C. (160° F.) cannot be spray atomized due to their tendency to "block" or adhere to one another under normal storage and temperature conditions. Higher melting point paraffin and other higher melting point waxes that might be suitable for atomization are too costly to be used in gypsum manufacturing. EP 1556313 B1 suggests to overcome the problem by using a relatively narrow molecular weight distribution of a vegetable derived wax. Further the wax is relatively hard when compared to the low melting point paraffin that is typically used in emulsion manufacture for gypsum applications.

US 20130323508 A1 assigned to the present applicant (Sasol Wax GmbH) discloses a process for grinding waxes, preferably paraffin waxes, in a jet mill, including a fluidized bed counter jet mill, by using a polyol as a grinding aid. With this method wax powders have an average particle size $d_{50}$ (number average) of less than 10 μm, preferably less than 7 μm, or an average particle size $d_{90}$ (number average) of less than 15 μm, in preferably less than 10 μm (in each case according to ISO 13320:2009). With this method it is possible to grind waxes, which are not hard waxes (vegetable, natural or synthetic/partially synthetic) without cooling to obtain very fine granules in an economical way.

SUMMARY OF THE INVENTION

Object of the present invention is to provide a hydrophobing agent in the form of a fine wax powder, which is suitable for the manufacturing of a gypsum slurry, gypsum products, including plasterboard, cardboard and wallboard, which overcomes the difficulties described above such as the problems to grind the wax blend and separation of the wax phase from the gypsum slurry.

It is preferred to use small particles, which can be homogeneously mixed with the gypsum slurry, because powdered wax may separate from the gypsum slurry due to its hydrophobic properties, the lower density and low water solubility. If it is not homogenously distributed throughout the gypsum product the product will not show an uniform moisture resistance.

Claimed is a process for manufacturing a gypsum slurry comprising:
bringing together and mixing at least the following components: gypsum, water and a wax powder, wherein 0.1 to 10 wt.-% of the wax powder are contained in the gypsum slurry, relative to the mass of dry gypsum;
the wax powder having
a particle size below 500 μm,
an average particle size $d_{50}$ (number average) of below 300 μm; and
the wax powder consists of or comprises the following wax composition:
i. 70 to 95 wt.-% hydrocarbon wax,
ii. 5 to 30 wt.-% of a polar wax,
iii. 0 to 10 wt.-% hydrocarbon resins, and
iv. 0.1 to 5 wt.-% of one or more components selected from the group consisting of one or more polyols, starches, sugars, polyvinylalcohols and its derivatives; and
wherein
the wax composition has a dynamic viscosity at 100° C. of below 12 cP and
the acid number of the wax composition is below 10 mg KOH/g.

Further claimed is a gypsum product and use of a wax powder having
a particle size below 500 μm,
an average particle size $d_{50}$ (number average) of below 300 μm; and the wax powder consists of or comprises of the following wax composition:
i. 70 to 95 wt.-% hydrocarbon wax,
ii. 5 to 30 wt.-% of a polar wax,
iii. 0 to 10 wt.-% hydrocarbon resins, and iv. 0.1 to 5 wt.-% of one or more components selected from the group consisting of one or more polyols, starches, sugars, polyvinylalcohols and its derivatives; and wherein the wax composition has a dynamic viscosity at 100° C. of below 12 cP and the acid number of the wax composition is below 10 mg KOH/g;

for the manufacture of a moisture resistant gypsum product wherein the gypsum product has a water-uptake according to DIN EN 520 of below 10 wt.-% after two hours at 23° C.

Further details are described in each case in the subordinate claims.

According to a further definition of the invention there is provided a process for manufacturing a gypsum slurry, the process comprising:

preparing a wax composition having a dynamic viscosity at 100° C. of below 12 cP and an acid number below 10 mg KOH/g, the wax composition consists of or comprises:
i. 70-95 wt.-% hydrocarbon wax,
ii. 5-30 wt.-% of a polar wax,
iii. 0-10 wt.-% hydrocarbon resins, and
iv. 0.1 to 5 wt.-% of one or more components selected from the group consisting of one or more polyols, starches, sugars, polyvinylalcohols and its derivatives;

converting the wax composition into a wax powder having a particle size of all the particles of the wax powder below 500 µm and the average particle size $d_{50}$ (number average) of the particles in the wax powder being below 300 µm;

mixing gypsum, water and the wax powder to form the gypsum slurry, wherein the gypsum slurry contains from 0.1-10 wt.-% of the wax powder, relative to the mass of dry gypsum.

A further aspect of the invention provides for the use of a wax powder for improving the moisture resistancy of a gypsum product, wherein the wax powder has a particle size of all the particles of the wax powder below 500 µm and the average particle size $d_{50}$ (number average) of the particles in the wax powder being below 300 µm;

the wax powder consists of or comprises:
i. 70-95 wt.-% hydrocarbon wax,
ii. 5-30 wt.-% of a polar wax,
iii. 0-10 wt.-% hydrocarbon resins, and
iv. 0.1 to 5 wt.-% of one or more components selected from the group consisting of one or more polyols, starches, sugars, polyvinylalcohols and its derivatives; and the gypsum product has a water uptake according to DIN EN 520 of below 10 wt.-% after two hours at 23° C.

The object is solved by the embodiments described above and in the independent claims. Advantageous embodiments of the invention are specified in the subclaims or are described subsequently.

DETAILED DESCRIPTION OF THE INVENTION

It was surprisingly found that a wax powder comprising the following wax composition:
i. 70 to 95 wt.-% hydrocarbon wax,
ii. 5 to 30 wt.-% of a polar wax,
iii. 0 to 10 wt.-% hydrocarbon resins,
iv. 0.1 to 5 wt.-% of one or more components selected from the group consisting of one or more polyols, starches, sugars, polyvinylalcohols and its derivatives;

is very suitable as a hydrophobing agent in the production and manufacturing of a gypsum slurry and related gypsum products if used in a concentration of 0.1 to 10 wt.-%, relative to the mass of dry gypsum, in the gypsum slurry.

The wax powder is preferably added to the gypsum slurry by spraying or strewing and mixed.

A preferable embodiment of the wax composition according to the invention comprises 75 to 85 wt.-% hydrocarbon wax of mineral, synthetic or partially synthetic origin.

A further preferred embodiment of the wax composition comprises 15 to 25 wt.-% of a polar wax.

A further preferable embodiment of the wax composition comprises 0 to 2 wt.-% hydrocarbon resins.

One or more polyols, one or more starches, one or more sugars, one or more polyvinylalcohols and/or its derivatives, preferably one or more starches, one or more sugars, one or more polyvinylalcohols and/or its derivatives, are used as additive in the wax composition, e.g. to increase the paper adhesion of the plasterboards.

A further preferable embodiment of the wax composition comprises 0.3 to 2 wt.-% of one or more components selected from the group consisting of one or more polyols, starches, sugars, polyvinylalcohols and its derivatives.

The concentration of wax powder in the gypsum slurry is preferably 0.1 to 5 wt.-%, 1 to 3 wt.-% or 2 to 2.8 wt.-%.

Each particle of the wax powder has a particle size below 500 µm, preferably below 300 µm, more preferably below 200 µm and most preferably below 100 µm. The average particle size $d_{50}$ (number average) of the wax powder composition according to the invention is below 300 µm, preferably below 200 µm, more preferably below 100 µm and most preferably below 50 µm. With this particle distribution a homogeneous distribution of wax throughout the gypsum slurry can be obtained.

The particle size can be determined with different methods, either with laser diffraction or sieving. Both methods can be conducted in a wet or dry state of the powder. In a wet state the powder is dispersed in an aqueous medium and highly diluted to prevent agglomeration of the particles. For the laser diffraction method different instruments are suitable (e.g. Malvern Mastersizer 2000 or S, Beckman Coulter LS13320 or Sympatec HELOS). The wet sieving method is done according to ASTM D185 and the dry sieving according to DIN ISO 3310-1:2001-09 or by using an ALPINE 200 LS air-jet sieve.

The dynamic viscosity of the wax composition at 100° C. is below 12 cP, preferably below 10 cP, and most preferably below 8 cP. With this viscosity range an excellent sealing of micropores in the gypsum can be obtained during the setting and drying of the gypsum slurry. The dynamic viscosity of the wax composition was calculated based on the kinematic viscosity, measured with an Ubbelohde viscometer at 100° C. according to DIN 51562-2:1988-12, and the density of the wax composition at 100° C.

The acid number of the wax composition is below 10 mg KOH/g, preferably below 8 mg KOH/g and more preferably below 6 mg KOH/g. With this acid number range optimal hydrophobing results can be obtained. The acid number was determined according to the standard method DGF C-V 2 (from "Deutsche Einheitsmethoden zur Untersuchung von Fetten, Fettprodukten, Tensiden und verwandten Stoffen").

The congealing point of the wax composition (DIN ISO 2207:1983) is between 50 to 90° C., preferably between 60 to 80° C. and more preferably between 62 and 75° C.

The hydrocarbon wax according to the invention is selected from one or more members of the group consisting of a Fischer-Tropsch wax, a polyethylene wax and synthetic waxes.

The polar wax is selected from one or more members of the group consisting of oxidized paraffin, optionally partially or fully hydrogenated; oxidized Fischer-Tropsch wax, optionally partially or fully hydrogenated; an oxidized microcrystalline wax; an oxidized alpha-olefin wax, an oxidized polyethylene wax, an oxidized polyethylene copolymer wax; an urethane wax; ethyl vinyl acetate; an acrylate polymer and natural ester waxes, such as e.g. Montan wax and its derivatives, bees-wax or Carnauba wax.

The wax powder is preferably obtained by grinding in a jet mill, more preferably in a counter jet mill or a fluidized bed counter jet mill, at temperatures between 10 to 40° C., preferably 20 to 30° C. Furthermore the inventive wax powder can be obtained by direct spray atomization by methods used in wax powder production.

Additionally resins may be used in the wax composition in a concentration of 0.2 to 2 wt.-%, selected from one or more members of the group consisting of aliphatic resins, aromatic resins and natural resins, if appropriate modified resins e.g. pine resin or aliphatic polycyclic esters.

Polyols as grinding aid in solid or liquid form may be added, during the milling process, preferably polyols with 2 to 12 carbon atoms and 0 to 4 ether groups per molecule and at least 2 hydroxy groups per molecule, preferably up to 4 hydroxy groups per molecule. Therein 0.1 to 5 wt.-%, preferably 0.1 to 3 wt.-% and more preferably 0.2 to 2.5 wt.-% of at least one polyol may be added to the wax composition.

The invention also includes a process for manufacturing a gypsum product comprising:
providing the gypsum slurry described above,
moulding the gypsum slurry to bring the slurry into a three-dimensional form,
drying the three-dimensional form by applying heat to the three-dimensional form.

This gypsum product is optionally further characterised by a water-uptake according to DIN EN 520 of below 10 wt.-% after two hours in water at 23° C.

The gypsum product may be a wallboard or a plasterboard and the moulding may comprise:
providing a first layer of a paperboard,
distributing the gypsum slurry on the first layer of paperboard, and
providing a second layer of paperboard on the gypsum slurry opposite and in parallel to the first layer.

Plasterboards are industrially manufactured building boards essentially made up of gypsum, the surfaces and possibly also the longitudinal edges of which are surrounded by firmly adhered paperboard. The gypsum core surrounded by paperboard may contain air voids and additives to achieve the specified properties.

A further embodiment of the present invention concerns the use of the wax powder for the manufacture of a moisture resistant gypsum product wherein the gypsum product has a water-uptake according to DIN EN 520 of below 10 wt.-% after two hours in water at 23° C.

The wax powder has
a particle size below 500 μm, preferably below 300 μm, more preferably below 200 μm and most preferably below 100 μm;
an average particle size $d_{50}$ (number average) of below 300 μm preferably below 200 μm, more preferably 100 μm, most preferably below 50 μm; and
comprises the following wax composition:
70 to 95 wt.-% hydrocarbon wax,
5 to 30 wt.-% of a polar wax,
0.1 to 5 wt.-% of one or more components selected from the group consisting of one or more polyols, starches, sugars, polyvinylalcohols and its derivatives; and
optionally 0 to 10 wt.-% hydrocarbon resins; and
wherein
the wax composition has a dynamic viscosity at 100° C. of below 12 cP and
the acid number of the wax composition is below 10 mg KOH/g.

The invention is exemplified by the following examples without being restricted to them.

EXAMPLES

Plasterboards produced in the conventional way with the inventive wax powder compositions A-G (Table 1) show a good paper adhesion and a reduced water absorption (measured according to DIN EN 520 at 23° C.) in comparison to un-treated products (31 wt.-% water absorption). Emulsion 1 is a commercially available water-based wax dispersion.

The inventive wax powder compositions A-E were produced using a standard paraffin wax (Sasolwax 6403 with a congealing point of 64° C. and a viscosity at 100° C. of 6 cP) and a polar wax component (Sasolwax A28 or Sasolwax C80ox=oxidized Fischer-Tropsch waxes or Montan wax). These premixed wax blends were ground (A-C, G) or sprayed (D-F) to obtain a product in powder form.

The grinding was conducted in a jet mill and with the addition of TMP (Trimethylolpropane) as a grinding aid in examples B and C (as described in US 20130323508 A1).

All products were mixed with the starch and the particle size of the wax powder composition was determined by sieving with an ALPINE air jet-sieve e200LS according to the instruction manual in case of quoted $d_{50}$-values (A-C, G) or by sieving the wax blends with a brass sieve from Haver&Boecker with a diameter of 200 mm and a mesh size of 400 μm using a brush (according to DIN ISO 3310-1: 2001-09, examples D-F).

In case of the ALPINE air-jet sieve a sieve with the needed mesh size is introduced into the instrument and 50 g of the powder sample are put onto it. Afterwards the instrument is closed and the powder is sieved for 2 min at 250 mmWs. Afterwards the sieved and unsieved powder are balanced and the particle size ratio is calculated.

The results show that a clear relationship between particle size and water uptake exists. The smaller the particles of the wax powder compositions (A-C and F+G) the lower the water uptake.

In the face of known wax dispersions the inventive wax powders overcome the above mentioned disadvantages. Furthermore the addition of the wax does not negatively affect the flow rate and setting time of the gypsum slurry and has a low impact on the foam formation during the production process. Additionally the invention tackles the task to guarantee a sufficient vapour permeability of the gypsum products despite the moisture resistance.

The described difficulties at the production of advantageous wax powders based on paraffin waxes, such as jamming and blocking of the mill or the spraying nozzles, can be solved by the special production method of the inventive wax powders. Furthermore very small and fine wax particles are produced, which are preferably suitable for the application in gypsum products and can be obtained in an economical feasible and practicable manner.

The proper amount of polar waxes, the resulting acid number of the wax blend and the low viscosity lead to a superior processability of the wax blends, and an improved moisture resistance of the gypsum products manufactured with the inventive wax powder compositions.

TABLE 1

| Ex. | Composition | Congealing point [° C.] | Kinematic viscosity at 100° C. [mm²/s] | Density [kg/m³] | Dynamic viscosity at 100° C. [cP] | Acid Number [mg KOH/g] | Dosage [wt.-%] | Particle size [μm] average sizes or size of all particles | Water uptake [wt.-%] |
|---|---|---|---|---|---|---|---|---|---|
| Emu 1 | HydroWax 170 Emulsion | 66 | | | 7-8 | 1-1.5 | 3.6 + 0.1 starch | $d_{50}$ = 540 μm | 5.4 |
| A | 80% Paraffin wax, 20% A28 | 73 | 10.1 | 782.5 | 7.9 | 5.6 | 2.5 + 0.3 starch | $d_{50}$ = 196 μm | 7.4 |
| B | 79.6% Paraffin wax, 19.9% A28 0.5% TMP | 73 | 10.1 | 782.5 | 7.9 | 5.6 | 2.5 + 0.3 starch | $d_{50}$ = 106 μm | 6.5 |
| C | 79.6% Paraffin wax, 19.9% A28, 0.5% TMP | 73 | 10.1 | 782.5 | 7.9 | 5.6 | 2.5 + 0.3 starch | $d_{50}$ = 67 μm | 2.5 |
| D | 80% Paraffin wax, 20% C80ox | 66 | 6.9 | 779.9 | 5.4 | 5.5 | 2.5 + 0.3 starch | <400 μm | 4.5 |
| E | 70% Paraffin wax, 30% Montan wax | 63.5 | 10.8 | 782.5 | 8.6 | 6.7 | 2.5 + 0.3 starch | <400 μm | 4 |
| F | 70% Paraffin wax, 30% A28 | 76.5 | 11.7 | 787.5 | 9.2 | 9.4 | 2.5 + 0.3 starch | <400 μm | 10.5 |
| G | 70% Paraffin wax, 30% A28 | 76.5 | 11.7 | 787.5 | 9.2 | 9.4 | 2.5 + 0.3 starch | $d_{50}$ = 20 μm | 1.9 |

The invention claimed is:

1. A process for manufacturing a gypsum slurry comprising:
   bringing together and mixing at least the following components: gypsum, water and a wax powder, wherein 0.1 to 10 wt.-% of the wax powder are contained in the gypsum slurry, relative to mass of dry gypsum;
   the wax powder, before being brought together and mixed with the gypsum and water, having
      a particle size below 500 μm for all wax particles, and an average particle size $d_{50}$ (number average) of below 200 μm; and
   the wax powder comprises the following wax composition:
      i. 70 to 95 wt.-% hydrocarbon wax,
      ii. 5 to 30 wt.-% of a polar wax,
      iii. 0 to 10 wt.-% hydrocarbon resins, and
      iv. 0.1 to 5 wt.-% of one or more components selected from the group consisting of one or more polyols, starches, sugars, and derivatives thereof; and
   wherein
   the wax composition has a dynamic viscosity at 100° C. of below 12 cP and
   the wax composition has an acid number below 10 mg KOH/g.

2. The process according to claim 1, wherein the wax composition comprises:
   i. 75 to 85 wt.-% hydrocarbon wax,
   ii. 15 to 25 wt.-% of a polar wax,
   iii. 0 to 2 wt.-% hydrocarbon resins, and
   iv. 0.3 to 2 wt.-% of one or more components selected from the group consisting of one or more polyols, starches, sugars, and derivatives thereof.

3. The process according to claim 1, wherein 0.1 to 5 wt.-% of the wax powder are contained in the gypsum slurry, relative to the mass of dry gypsum.

4. The process according to claim 1, wherein the wax powder consists of wax particles having a particle size below 300 μm for all wax particles.

5. The process according to claim 1, wherein the average particle size $d_{50}$ (number average) of the wax powder is below 50 μm.

6. The process according to claim 1, wherein the dynamic viscosity at 100° C. of the wax composition is below 10 cP.

7. The process according to claim 1, wherein the acid number of the wax composition is below 8 mg KOH/g.

8. The process according to claim 1, wherein the wax composition has a congealing point according to DIN ISO 2207:1983 between 50 to 90° C.

9. The process according to claim 1, wherein independent of each other:
   a) the hydrocarbon wax is selected from one or more members of the group consisting of Fischer-Tropsch wax, polyethylene wax and synthetic wax;
   b) the polar wax is selected from one or more members of the group consisting of oxidized paraffin, optionally partially or fully hydrogenated; oxidized Fischer-Tropsch wax, optionally partially or fully hydrogenated; oxidized microcrystalline wax; oxidized alpha-olefin wax, oxidized polyethylene wax, oxidized polyethylene copolymer wax; urethane wax; ethyl vinyl acetate; acrylate polymer and natural ester wax;
   c) the hydrocarbon resin is selected from one or more members of the group consisting of aliphatic resins, aromatic resins and natural resins, and is optionally 0.2 to 2 wt.-% of the hydrocarbon resin are contained in the wax composition.

10. The process according to claim 1, wherein the process further comprises grinding of the wax composition in a jet mill at temperatures between 10 to 40° C. to obtain the wax powder.

11. The process according to claim 1, wherein the process further comprises direct spray atomization of the wax composition to obtain the wax powder.

12. The process according to claim 1, wherein the wax composition further comprises 0.1 to 5 wt.-% of at least one polyol with 2 to 12 carbon atoms, optionally 0 to 4 ether groups per molecule, and at least 2 hydroxy groups per molecule.

13. A process for manufacturing a gypsum product comprising:
   providing the gypsum slurry according to claim 1,
   moulding the gypsum slurry to bring the slurry into a three-dimensional form,
   drying the three-dimensional form by applying heat to the three-dimensional form.

14. The process for manufacturing a gypsum product according to claim 13, wherein the gypsum product is a wallboard or a plaster board and the moulding comprises:
   providing a first layer of paperboard,
   distributing the gypsum slurry on the first layer of paperboard, and
   providing a second layer of paperboard on the gypsum slurry opposite from and parallel to the first layer.

15. A gypsum product obtainable from the process of claim 13.

16. The gypsum product according to claim 15 having a water-uptake according to DIN EN 520 of below 10 wt.-% after two hours at 23° C.

\* \* \* \* \*